United States Patent
Matsubara et al.

(10) Patent No.: US 7,457,239 B2
(45) Date of Patent: Nov. 25, 2008

(54) METHOD AND APPARATUS FOR PROVIDING A QUALITY OF SERVICE PATH THROUGH NETWORKS

(75) Inventors: Daisuke Matsubara, Santa Clara, CA (US); Satoshi Yoshizawa, Saratoga, CA (US); Kenichi Otsuki, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 687 days.

(21) Appl. No.: 09/816,067

(22) Filed: Mar. 22, 2001

(65) Prior Publication Data

US 2004/0202159 A1    Oct. 14, 2004

(51) Int. Cl.
*H04L 12/28* (2006.01)
(52) U.S. Cl. ............... 370/230; 370/401; 370/468
(58) Field of Classification Search ............... 370/395.1, 370/395.21, 395.2, 229–238.1, 401, 468
See application file for complete search history.

(56) References Cited

U.S. PATENT DOCUMENTS

| | | | | |
|---|---|---|---|---|
| 5,933,425 | A * | 8/1999 | Iwata | 370/351 |
| 5,953,338 | A * | 9/1999 | Ma et al. | 370/395.21 |
| 6,094,687 | A * | 7/2000 | Drake, Jr. et al. | 709/241 |
| 6,463,062 | B1 * | 10/2002 | Buyukkoc et al. | 370/395.1 |
| 6,584,071 | B1 * | 6/2003 | Kodialam et al. | 370/238 |
| 6,795,445 | B1 * | 9/2004 | Kabie et al. | 370/401 |
| 2002/0122422 | A1 * | 9/2002 | Kenney et al. | 370/392 |
| 2004/0131013 | A1 * | 7/2004 | Ise et al. | 370/229 |
| 2004/0136379 | A1 * | 7/2004 | Liao et al. | 370/395.21 |

OTHER PUBLICATIONS

T. Li, Juniper Networks; Y. Rekhter, Cisco Systems; "A Provider Architecture for Differentiated Services and Traffic Engineering", Oct. 1998, 15 pages.

S. Blake, Torrent Networking Technologies; D. Black, EMC Corporation; M. Carlson, Sun Microsystems; E. Davies, Nortel UK; Z. Wang, Bell Labs Lucent Technologies; W. Weiss, Lucent Technologies; "An Architecture for Differentiated Services", Dec. 1998, 34 pages.

R. Braden, ED., ISI; L. Zhang, UCLA; S, Berson, ISI; S. Herzog, IBM Research; S. Jamin, Univ. of Michigan; "Resource ReSerVation Protocol (RSVP)", Sep. 1997, 105 pages.

* cited by examiner

*Primary Examiner*—Min Jung
(74) *Attorney, Agent, or Firm*—Townsend and Townsend and Crew LLP

(57) ABSTRACT

A core network that includes a number of relay nodes and edge nodes, intercoupled by network links, interconnects a plurality data transfer entities through gateway elements. Each gateway element is allocated a portion of the data communicating (QoS) resource of certain of the links, and maintains information of that allocation. When a gateway receives a request for a data transfer from a data transfer entity with a particular communicating resource requirement, it will check its associated information to determine of the allocated resource is sufficient. If not, the gateway may ask for a reconfiguration of resources that re-allocate communicating resource from one gateway element to the asking gateway element.

12 Claims, 10 Drawing Sheets

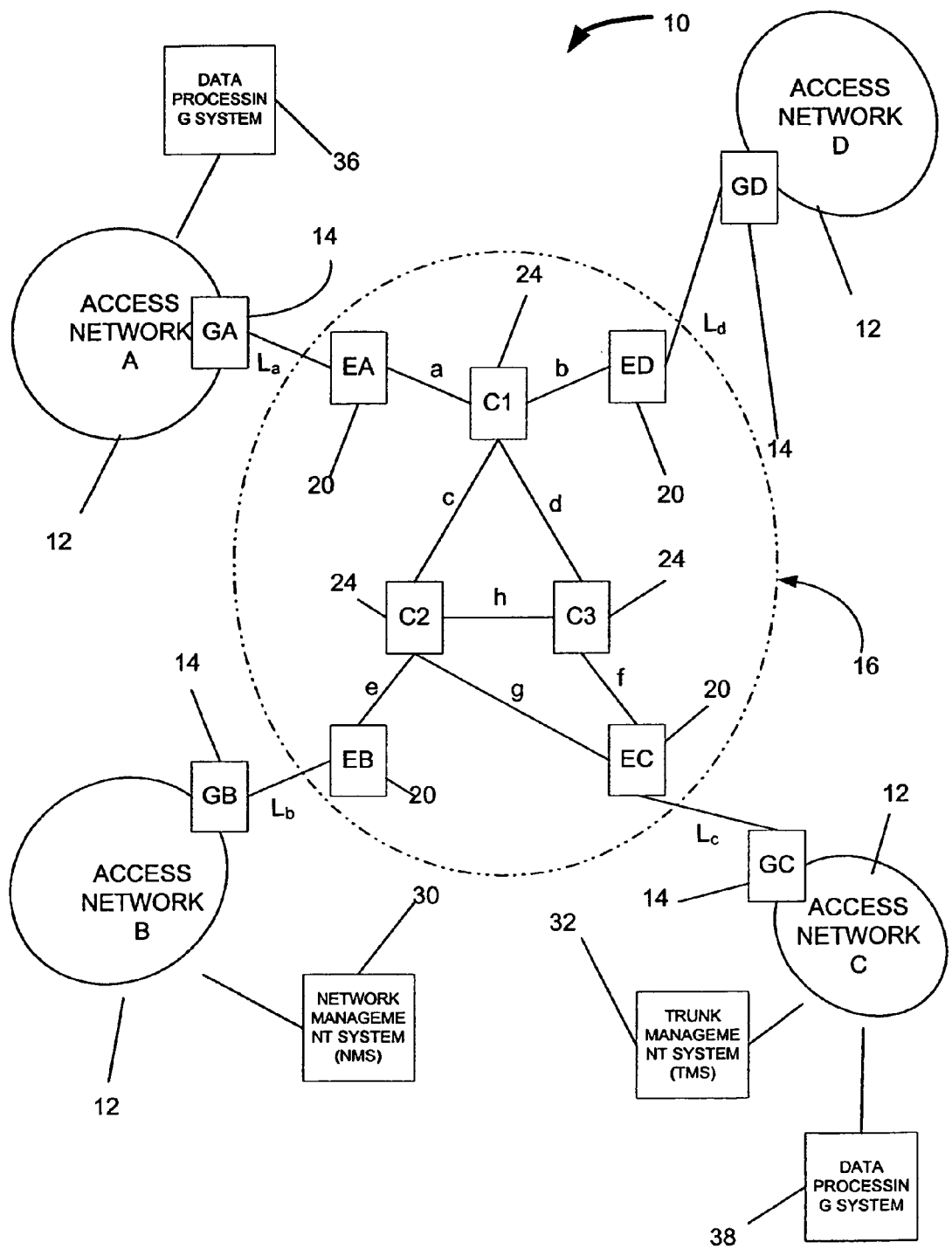
FIG_1

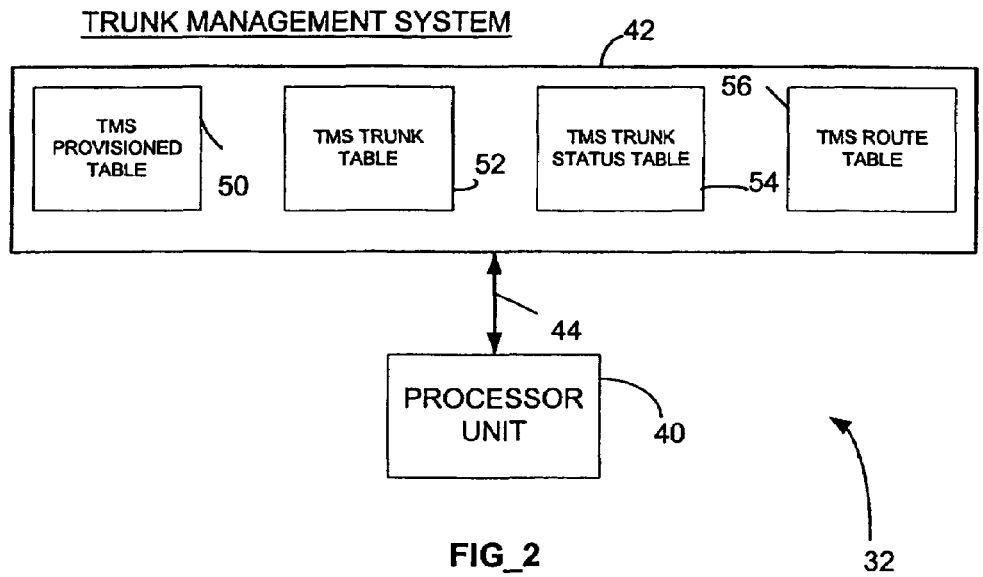
FIG_2
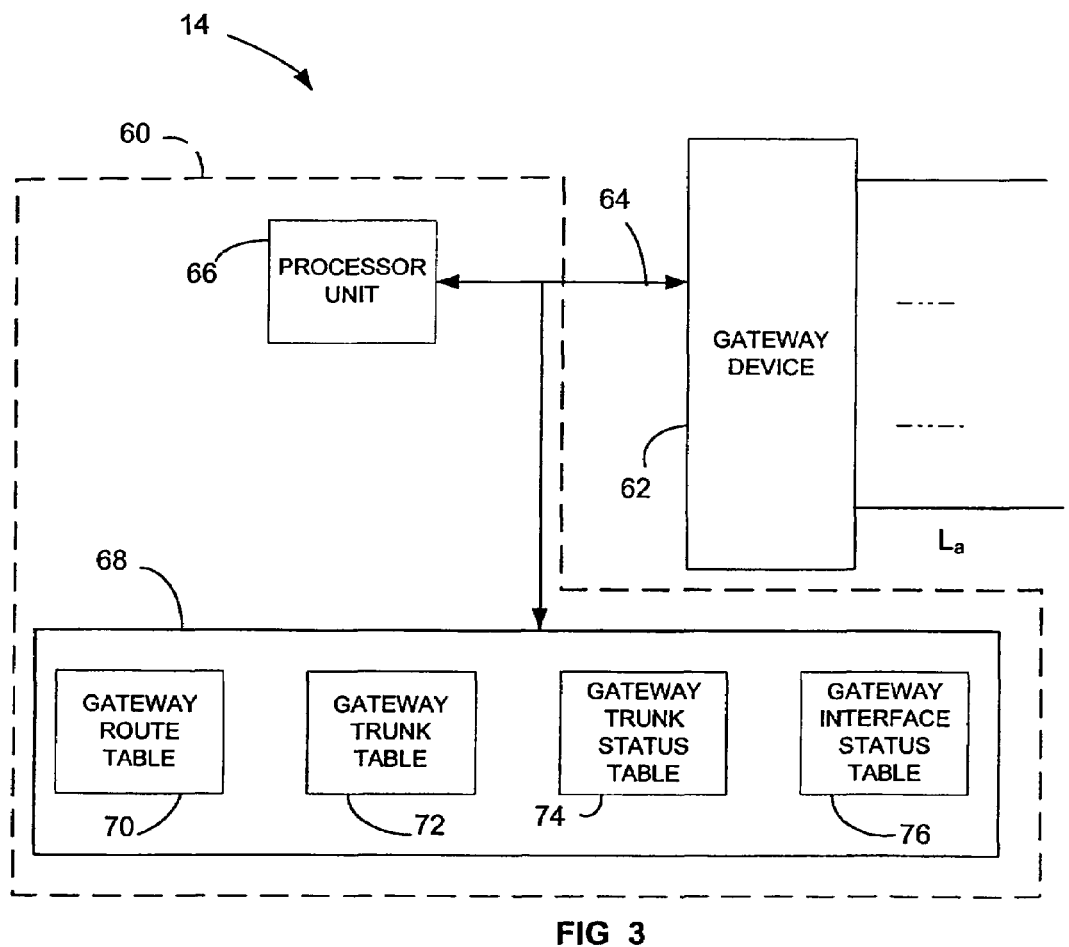
FIG_3

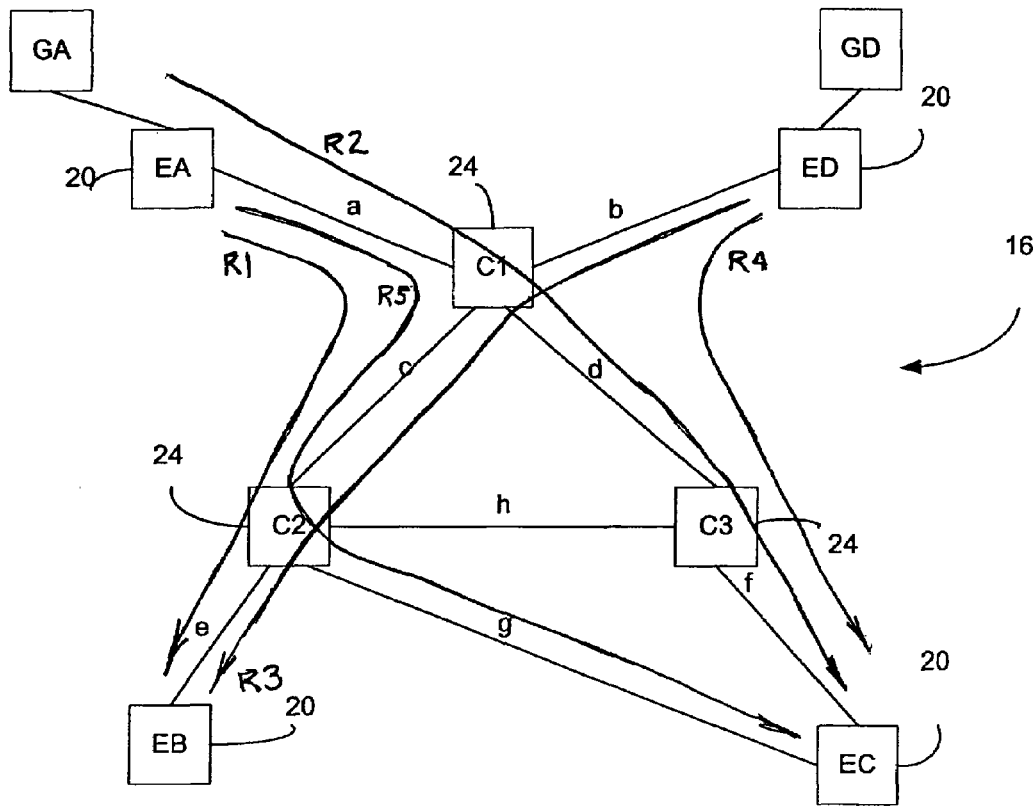
FIG_4
TMS ROUTE TABLE
| Gateway | Connection | Route | Link(s) |
|---|---|---|---|
| GA | EA-EB | R1 | a, c, e |
| GA | EA-EC | R2 | a, d, f |
| GA | EA-EC | R5 | a, c, g |
| GD | ED-EB | R3 | b, c, e |
| GD | ED-EC | R4 | b, d, f |
FIG_5

| Gateway | Connection | Route | Link(s) |
|---|---|---|---|
| GA | EA -> EB | R1 | a, c, e |
| | EA -> EC | R2 | a, d, f |
| | | R5 | a, c, g |

FIG_6A

| Gateway | Connection | Route | Link(s) |
|---|---|---|---|
| GD | ED -> EB | R3 | b, c, e |
| | ED -> EC | R4 | b, d, f |

FIG_6B

| Provisioned Link | Bandwidth |
|---|---|
| EA->C1 | 100 |
| C1->C2 | 100 |
| C2->EB | 100 |
| ED->C1 | 100 |
| E1->C3 | 100 |
| C3->EC | 100 |
| C2->EC | 50 |

FIG_7

GATEWAY (GA) TRUNK TABLE

| Trunk | Provisioned Link | Bandwidth |
|---|---|---|
| Aa | EA->C1 | 100 |
| Ac | C1->C2 | 50 |
| Ad | C1->C3 | 50 |
| Ae | C2->EB | 50 |
| Af | C3->EC | 50 |
| Ag | C2->EC | 50 |

FIG_8A

GATEWAY (GD) TRUNK TABLE

| Trunk | Provisioned Link | Bandwidth |
|---|---|---|
| Db | ED->C1 | 100 |
| Dc | C1->C2 | 50 |
| Dd | C1->C3 | 50 |
| De | C2->EB | 50 |
| Df | C3->EC | 50 |

FIG_8B

TMS TRUNK STATUS TABLE

| Gateway | Trunk | Provisioned Link | Bandwidth | Used | Available |
|---|---|---|---|---|---|
| GA | Aa | EA->C1 | 100 | 90 | 10 |
| GA | Ac | C1->C2 | 50 | 40 | 10 |
| GA | Ad | C1->C3 | 50 | 50 | 0 |
| GA | Ae | C2->EB | 50 | 40 | 10 |
| GA | Af | C3->EC | 50 | 50 | 0 |
| GA | Ag | C2->EC | 50 | 0 | 50 |
| GD | Db | ED->C1 | 100 | 90 | 10 |
| GD | Dc | C1->C2 | 50 | 50 | 0 |
| GD | Dd | C1->C3 | 50 | 40 | 10 |
| GD | De | C2->EB | 50 | 50 | 0 |
| GD | Df | C3->EC | 50 | 40 | 10 |

FIG_9

GATEWAY (GA) TRUNK STATUS TABLE    130A

| Trunk | Provisioned Link | Bandwidth | Used | Available | Link |
|---|---|---|---|---|---|
| Aa | EA->C1 | 100 | 90 | 10 | a |
| Ac | C1->C2 | 50 | 40 | 10 | c |
| Ad | C1->C3 | 50 | 50 | 0 | d |
| Ae | C2->EB | 50 | 40 | 10 | e |
| Af | C3->EC | 50 | 50 | 0 | f |
| Ag | C2->EC | 50 | 0 | 50 | g |

FIG_10A

130D    GATEWAY (GD) TRUNK STATUS TABLE

| Trunk | Provisioned Link | Bandwidth | Used | Available | Link |
|---|---|---|---|---|---|
| Db | ED->C1 | 100 | 90 | 10 | b |
| Dc | C1->C2 | 50 | 50 | 0 | c |
| Dd | C1->C3 | 50 | 40 | 10 | d |
| De | C2->EB | 50 | 50 | 0 | e |
| Df | C3->EC | 50 | 40 | 10 | f |

FIG_10B

**INTERFACE STATUS
TABLE (GATEWAY GA)** — 140A

| Interface | Bandwidth | Used | Available |
|---|---|---|---|
| G(1) | 100 | 80 | 20 |
| G(2) | 50 | 20 | 30 |
| G(3) | 50 | 30 | 20 |
| G(4) | 50 | 10 | 40 |
| G(5) | 50 | 20 | 30 |

FIG_11

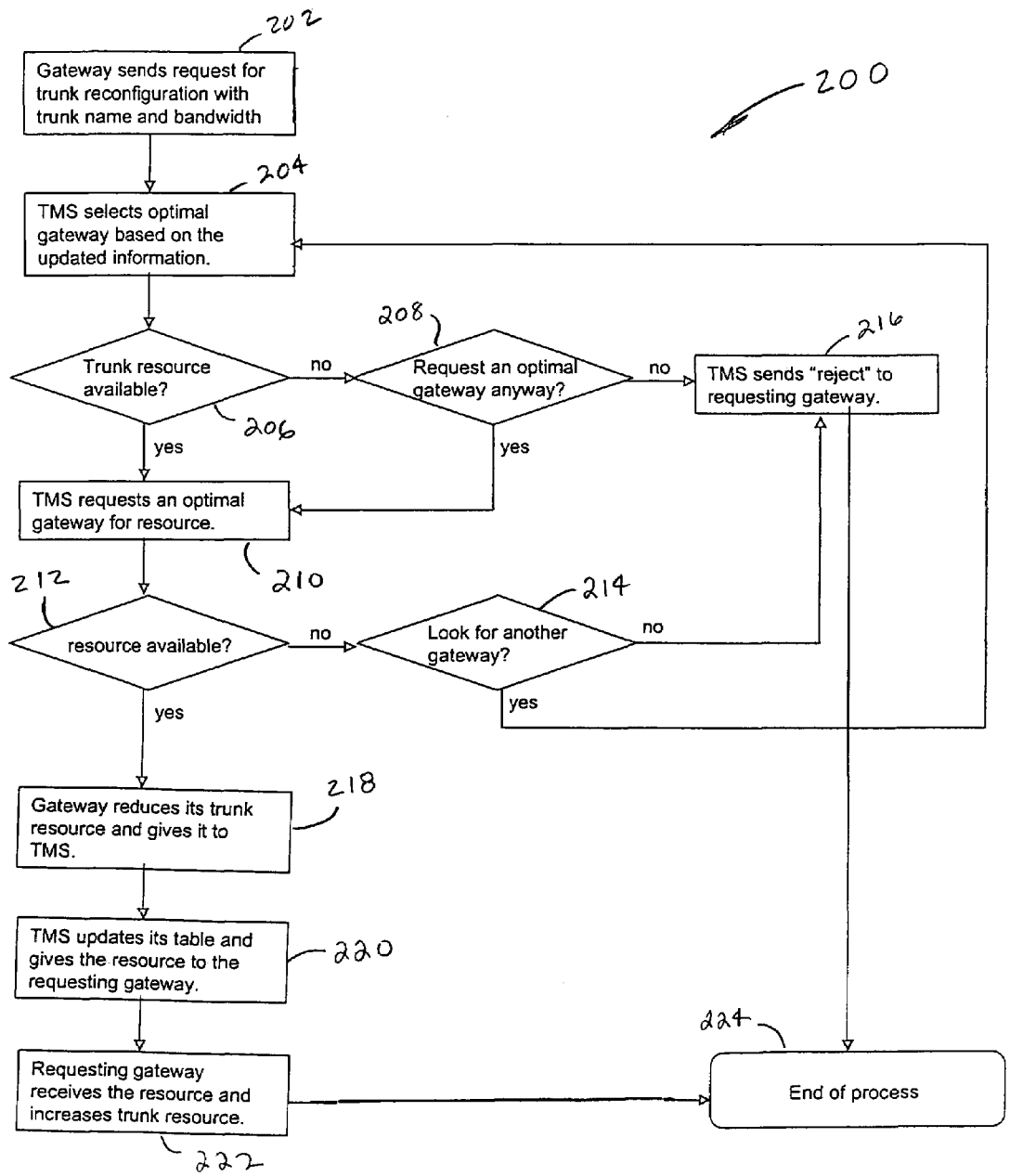
FIG_13

METHOD AND APPARATUS FOR PROVIDING A QUALITY OF SERVICE PATH THROUGH NETWORKS

BACKGROUND OF THE INVENTION

The present invention relates generally to data processing, and more particularly to management of a network to control data communications through the network.

It has become popular to provide a guaranteed data communication level through a particular data network. Termed "Quality of Service" (QoS), it is a guarantee that end-to-end quality characteristics of data communication, such as latency, data loss, etc., will not exceed a specified level. There is an increasing demand on current networks to deliver QoS for such applications as interactive video communication and high quality video distribution. QoS requires a network to allocate enough network resource (e.g., bandwidth capacity) end to end for the application. Multi Protocol Label Switching (MPLS) is one technique that allows dedicated paths to be set up across a core network to achieve QoS. MPLS gives each packet entering a network a label or identifier that contains information indicative of the destination. However, as a network grows, the number of MPLS paths will increase significantly (on the order of n2, where n is the number of paths). Since MPLS paths, and the resource of each path, are preassigned, increasing the number of nodes will tend to decrease the resource that can be allocated to each path, limiting the capacity of each path. (As used herein, "resource" is the data handling or communicating capability of a path.) Also, if the paths are created each time a request for a data transfer through the core network is made, the job of path creation would become huge, and the computing power at each node of the core network would need to be immense.

Another technique for QoS is to use a resource reservation protocol (RSVP). RSVP requires, however, that reservation and confirmation of the resource occur on every node through which the data will pass every time the connection is made. This, in turn, will tend to create long delays while a connection is being established. Also, RSVP suffers from the same problems as MPLS networks: as the network grows in size, the number of connections and the number of transactions for the reservation that a node must handle will also grow, and rapidly. Network growth, then, will require a computational power at each node for the connection process that is daunting. Network growth will tend to create a situation in which the network nodes are unable to handle the necessary connections and transactions. This makes RSVP difficult to scale in large networks.

Thus, there is a need for a scalable technique of providing QoS paths connections through a network.

BRIEF SUMMARY OF THE INVENTION

The present invention provides a method, and apparatus for implementing that method, of controlling admission to a core network and creating data communication paths through that network with specified resource.

Broadly, according to the present invention, a number of relay nodes, such as ATM switches, routers, or similar devices, are interconnected by network links to form a core network for communicating data. The core network is coupled to and interconnects data transfer entities, such as sub-networks or data processing systems, by gateway elements. Communicatively coupled to the gateway elements is a management system that operates to allocate to the gateway portions of the data communicating resources of predetermined ones of the network links, thereby providing each of the gateway element routes through the core network from each gateway element to other of the gateway elements.

Data transfers across the core network, according to the present invention, from one data transfer entity coupled to one gateway element to another data transfer entity coupled to another gateway element begins with a request to the associated gateway element with specifics as to the QoS resources needed for the data transfer. The gateway element that will be doing the sending (the "sending gateway") will check to see if the resources allotted to it are sufficient to meet the needs of the request. If so, the requested data transfer is granted, and the sending gateway element performs the necessary packet adding for a QoS transfer as is conventional. If, however, the resources available to the sending gateway element are not sufficient, additional resources can be borrowed from other gateway element allocations by a request for "reconfiguration" to the management system. If sufficient resources can be re-allocated, the sending gateway element will permit the requested data transfer as before; if not, the request for a data transfer will be refused.

An advantage of the present invention is that a packet switching network is provided a communicative connection with a guaranteed end-to-end QoS path.

A further advantage of the invention is the elimination, in packet switching networks, of the need to reserve and control a network resource in a core network on a per connection basis. This feature of the invention will reduce the necessary computational power of network nodes of the core network, reduce delay time involved in data transfers, and reduce the number of control packets for connection setup and resource reservation.

Another advantage of the invention is that a packet switching network system can now manage the network resources of a core network, increasing the efficiency of a QoS controlled network.

A still another advantage of the present invention is that a packet switching network system is made less vulnerable to physical layer errors (e.g., transmission path disconnections) or logical path errors (e.g. MPLS path disconnections).

These and other advantages and features of the present invention will become apparent to those skilled in this art upon a reading of the following description of the embodiments of the invention, which should be taken in conjunction with the accompanying drawings.

BRIEF DESCRIPTION OF THE DRAWINGS

FIG. 1 illustrates generally a simplified block diagram of a data communicating network incorporating the teachings of the present invention;

FIG. 2 is a block diagram broadly illustrating the architecture of a Trunk Management System shown in FIG. 1;

FIG. 3 is a block diagram broadly illustrating a gateway element shown in FIG. 1;

FIG. 4 is an illustration of routes through the core network shown in FIG. 1 as assigned by the Network Management System;

FIG. 5 is an illustration of a route table as developed by the Network Management System;

FIGS. 6A and 6B illustrate route tables as maintained by each of the gateway elements shown in FIG. 1;

FIG. 7 is an illustration of a provisioned link table, showing assignment of data communicating resources to certain of the data communicating links used in the core network shown in FIG. 1;

FIGS. 8A and 8B illustrate Trunk Tables maintained by each gateway element, containing information as to the data communicating capacity of each provisioned link available to such gateway element;

FIG. 9 illustrates a TMS Trunk Status Table created by the trunk management system of FIG. 1, containing information as to the status of each trunk for each gateway element of FIG. 1;

FIGS. 10A and 10B are illustrations of Gateway Trunk Status Tables;

FIG. 11 is an illustration of a Gateway Interface Table;

FIG. 13 is a flow diagram broadly illustrating the steps taken in response to a gateway element for a trunk reconfiguration in an effort to obtain a route through the core network with a data communicating capacity that can respond to a request for admission to the core network.

DESCRIPTION OF THE SPECIFIC EMBODIMENTS

Figure 12:
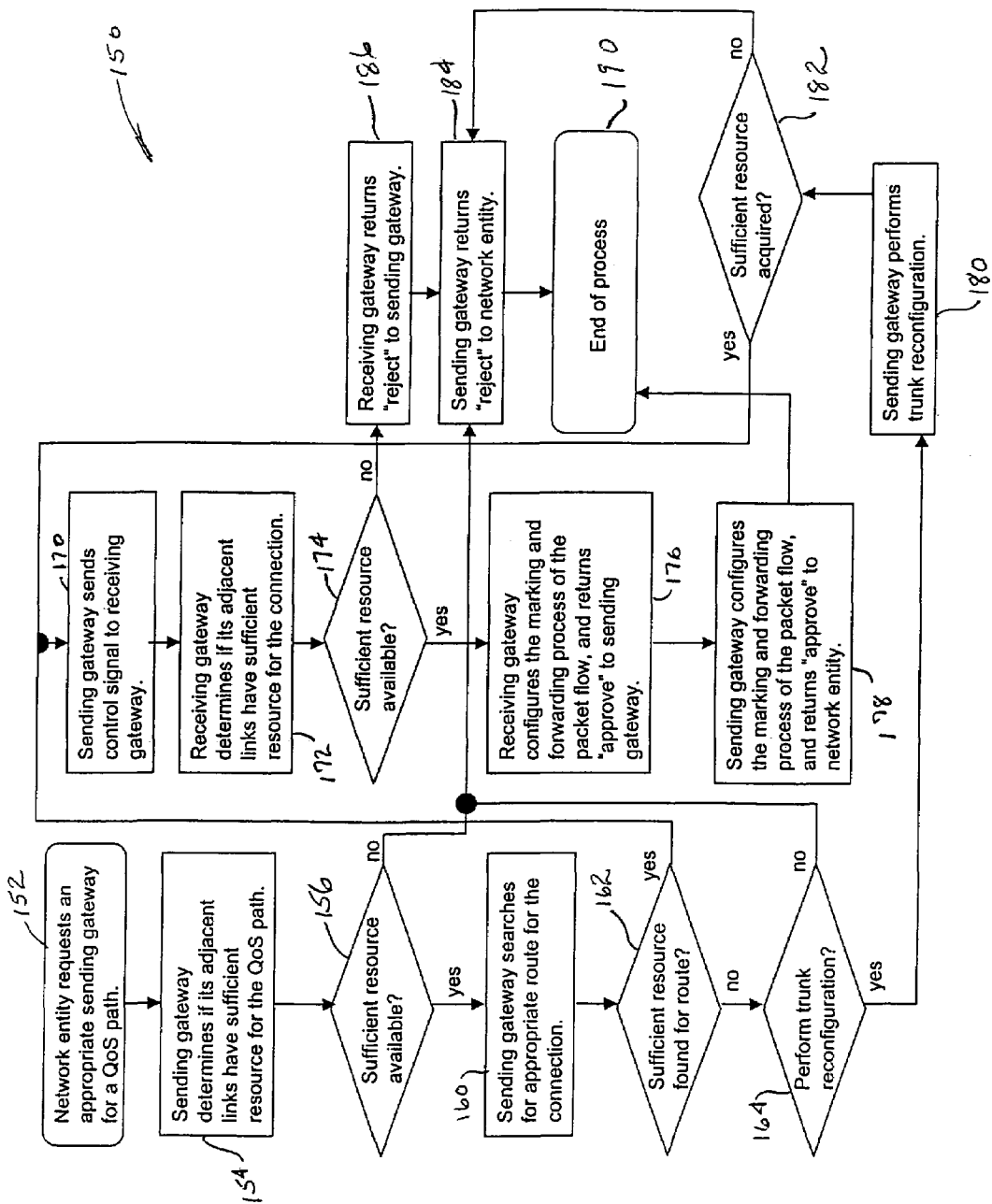
FIG. 12 is an flow diagram broadly illustrating the steps taken by a gateway element to respond to a request for admission to the core network by a data sending element to communicate data.

Turning now to the Figures, FIG. 1 illustrates a simplistic packet switching network architecture 10 in which sub-networks or access networks 12 (labeled A, B, C, and D) are each coupled to gateway units 14 (GA, GB, GC, and GD) which, in turn, couple the access networks 12 to a core network 16. Core network 16 is an arrangement of edge nodes 20 and relay nodes 24 interconnected by data communicating links a, b, . . . , h. Edge and relay nodes 20 and 24 may be conventional router elements, switch elements, or similar devices for routing packets for receiving and forwarding packets between a source and destination.

The network architecture 10 includes a network management system (NMS) 30 and trunk management system (TMS) 32 communicatively connected to one another, and to the gateway units 14, by coupling them to the access networks B and C for in-line communication. NMS and TMS 30, 32 are preferably coupled to one another by the in-line communication provided by the core network 16, and thereby also communicately connecting the TMS 32 to the gateways elements 14. However, if direct lines are used, the NMS 30 need only be connected to the TMS 32, and the edge and relay nodes 20, 24, while the TMS 32 need only be connected to the gateway elements 14.

As will be seen, TMS and NMS function to reserve "resources" within the core network. This means that the links a, b, . . . , h of the core network are identified as having a particular data handling capability (e.g., 100 Mbps). Then, the data handling capability of each link is assigned, either in whole or in part, to the gateways 14. The gateways will then manage data communicating admission to the core network, based upon the data handling capability provided it.

The access networks 12 will include various data processing elements and systems such as representatively shown by data processing systems 36 and 38. The data processing elements/systems within a particular access network may communicate among themselves via the particular access network, or they may communicate with data processing elements/systems of other access networks through QoS paths established according to the present invention by requesting a data transfer of certain characteristics.

FIG. 2 illustrates, in general block diagram form, the TMS 32. As shown, the TMS 32 includes a processor unit 40 coupled to a memory system 42 by a system bus 44. The memory system 42 will hold various tables according to the present invention, including a TMS provisioned table 50, a TMS trunk table 52, a TMS trunk status table 54, and a TMS route table 56.

Illustrated in FIG. 3 is the structure of the gateway 14 used to implement the individual gateways GA, GB, GC, and GD. As FIG. 3 shows, the gateway 14 (e.g., gateway GA) comprises a control unit 60 coupled to a gateway device 62 by a communicative coupling 64. The control section 60 provides the intelligence of the gateway 14, and includes a processor unit 66 and storage 68—also coupled to one another by the coupling 64. The processor unit 66 may be implemented by a microprocessor element, or it may be a state machine or a multiple state machine implementation. The storage 68 may be of any form of storage, including magnetic media, although preferably it is semiconductor memory.

The processor unit 66 manages information received from the NMS 30 in a number of tables, including gateway route table 70, a gateway trunk table 72, and a gateway trunk status table 74. In addition, the control unit 60 sets up and manages a gateway interface table 76 that identifies the different interfaces of the gateway device that connect to network links such as the access network associated with the gateway 14, and the link L (e.g., La or Lb) that couples the gateway 14 to the associated edge node 20 (FIG. 1).

The control section 60 of the gateway 14 operates to monitor and manage the network traffic of the networks to which it connects through control of the gateway device 62. Messages (i.e., packets) originating from a network element (e.g., data processing system 36—FIG. 1) of the associated access network 12 bound for another access network through the core network 16 are provided additional header information to assign them to the resource and route assigned to the gateway. The gateway device will have the necessary storage to queue and release to the core network 16 in accordance with the QoS path request by the sending entity and according to the particular resource available.

During an initialization period, predetermined routes and pre-defined link resources (e.g., bandwidth, class, etc.) are created by the NMS 30. FIG. 4 is an illustrative example of possible one way routes through the core network 16 and assigned to the gateways GA and GD coupled to the edge nodes EA and ED, labeled R1, R2, . . . , R5. For example, route R1 connects the edge nodes EA and EB to one another through the relay nodes C1 and C2. Similarly, the gateway GA is assigned two separate routes R2 and R5 from edge node EA to edge node EC through (1) relay nodes C1 and C3 and C1 and C2. Routes R3 and R4 are assigned to the gateway GD. Similar one-way routes (not shown) would be assigned to the gateways GB and GC, but are not shown in order to not unduly complicate FIG. 4 and the following discussion.

As is conventional, the edge and relay nodes 20, 24 include queuing and buffering mechanisms that allow transfer rates for certain QoS classes through that node to be set. The NMS 30 sends control information to the edge and relay nodes to set the queuing control, thereby setting the resource of a link. In the same manner, the control information sent by the NMS 30 to the edge and relay nodes 30, 32 can also modify the routing information typically maintained by the node, to thereby assign specific routes.

Shown in FIG. 5 is an example of the TMS Routing Table 80 prepared during initialization by the NMS 30, and provided to the TMS 32. Although not shown for reasons of clarity, the TMS Route Table 80 would also contain information pertaining to the routes assigned the other gateways such as GB and GC.

As FIG. 5 shows, the TMS Route Table 80 includes a "Gateway" column 82, identifying the particular gateways. In a next column 84 are, adjacent each gateway identification in column 82, are the connections established by the route—in terms of the edge nodes involved. The next column 86 identifies the route formed by the connection. Thus, for example, referring to FIG. 4, the edge nodes EA, EB, and EC form the connections identified as EA-EB and EA-EC that establish the routes R1, R2, and R5. Note that the connection, as FIG. 4 shows, has two routes, R2 and R5, for the EA-EC connection. Similarly, the gateway GD is shown as having a connection ED-EB established by the route R3, and a connection ED-EC established by the route R4.

Column 88 of FIG. 5 identifies the network links of the core network 16 that form the routes assigned each gateway GA and GB. Route R1, for example, uses network links a, c, and e, while route R2 uses links a, d, and f, and so on.

A portion of the information contained in the TMS Route Table 80 is transmitted to each of the gateways 12 by the TMS 32. Such portion for gateways GA and GD are illustrated as being contained in the gateway route tables 80A and 80D shown in FIGS. 6A and 6B, respectively. The gateway route table for any gateway identifies the route or routes assigned it, the connections established for such route, and the network links that make up each such route. Again, gateways GB and GC would receive similar gateway route tables identifying the routes assigned them in the same terms.

NMS 30 is capable of controlling the edge and relay nodes 20 and 24, respectively, and thereby is able to set the data communication characteristics of the outputs of each, in effect setting such communication attribute of the paths or network links as the bandwidth as communication class (for this example class A). Using conventional differential service (DiffServ) architecture, or other QoS implementations, the output queues and associated queue control circuity can be set to have the edge and relay nodes classify, mark, police, shape and prioritize packets Thereby, the NMS 30 allocates a particular bandwidth to each direction specific link a, b, ..., h, "provisioning" each link of the core network 16 so allocated. Such links are referred to herein as "Provisioned Links."

Provisioning Table 90 FIG. 7, accordingly, is an example of provisioning of the links a, b, ..., f, identifying each provisioned link by the nodes it connects. Thus, link a, when assigned communication characteristics (through, as indicated, control of the driving node—here edge node EA), is identified in the Provisioned Link column 92 as EA→C1, having a bandwidth (as seen in the Bandwidth column 94) of 100 Mbps. Network links b, c, ..., g are similarly each identified by the nodes they interconnect, and each also allocated a bandwidth of 100 Mbps., with the exception of core network link g (connecting relay node C2 and edge node EC), which is allocated 50 Mbps.

From the viewpoint of the gateways to which the resources allotted the gateways, i.e., the provisioned links, are called the "Trunks" of that Gateway. Thus, referring to FIG. 4, in view of the fact that the distribution of resources by the TMS has resulted in providing the gateway GA with predefined routes R1, R2 and R5 containing core network links each provisioned with a particular bandwidth. Gateway GA is managing "Trunks" Aa, Ac, and Ae (which form route R1), Trunks Ad and Af (which, together with Trunk Aa form route R5) and Trunk Ag (which, together with Trunks Aa and Ac, form route R2). Gateway GD has similar Trunks. FIGS. 8A and 8B are Gateway Trunk Tables 100A and 100D, identifying the Trunks managed by the Gateways GA and GD, respectively. The first (left-most) column 102 of each Table 100A, 100D identifies the Trunks managed by that Gateway. The next column 104 provides the identification of the Provisioned Link that forms the Trunk, and the last column 106 specifies the bandwidth allocated the Trunk by the TMS 32.

As an example, the Gateway Trunk Table for Gateway GA (FIG. 8A) shows that among the Trunks it manages is Trunk Ac, of Provisioned Link C1→C2. Note also that the Gateway GA Trunk Ac is allotted 50 Mbps of 100 Mbps originally assigned to the Provisioned Link C1→C2. The remaining bandwidth (50 Mbps) is assigned the Trunk Dc managed by the Gateway GD as shown by FIG. 8B.

Of course, similar distributions would be made for the Gateways GB and GC so that there would be Gateway Trunk Tables for them also. Obviously, if any core network link a, ..., h can handle only 100 Mbps, then to distribute that bandwidth for direction specific provisioning for each gateway may require partitioning the bandwidth on some links three or even four ways, depending upon the routes established the NMS and TMS 30, 32 during initialization. Again, as explained above, only the gateways GA and GD are mentioned here in order not to unduly complicate the discussion and/or the drawings.

The TMS 32, after allocating resources to the core network links a, b, ..., g, and then distributing those resources to the gateways 12, creates and maintains information as to the status of each Trunk—for example in the TMS Trunk Status Table 110 shown in FIG. 9. As FIG. 9 illustrates, the TMS Trunk Status Table 110 identifies, in left-most columns 112, 114, and 116, each Gateway to which it has distributed resources, each Trunk managed by such Gateway, and the Provisioned Link identification of the Trunk. In addition, TMS 32 maintains information describing the status of each Trunk for each Gateway in terms of the bandwidth presently being used (column 122) and the amount of bandwidth available (column 124). As an example, note that FIG. 9 shows the 50 Mbps allocated Trunk Dd for the gateway GD by TMS 32 has only 10 Mbps available, and that 40 Mbps is presently in use.

FIGS. 10A and 10B are Gateway Trunk Status Tables 130A and 130D maintained by each of the gateways GA and GD, respectively. As can be seen, the Tables contain essentially the same information as the TMS Trunk Status Table, except for each gateway only. Also, the core network link that became a Provisioned Link when allocated resource by the TMS is identified.

As should be evident, the Gateway Trunk Status Tables 130 will continually be changing, because the communications handled by each gateway 14 will be changing. Communications through the gateways 14 start and stop, changing the amount of "Available" and "Used" resource shown for the trunks, according to which routes are used. In addition, the trunk status information is periodically sent to the TMS 32 to that it can change its TMS Trunk Status Table 110 to also reflect the status of the various gateway trunks. However, the information of the TMS Trunk Status Table 110 may lag that of the Gateway Trunk Status Tables by an amount that depends upon how soon and how often status information is sent to the TMS 32. For example, a gateway 14 may sent trunk status information just after it modifies its own Gateway Trunk Status Table, or it may sent status information on a less frequent basis, such as at predetermined periods of time, or it may send the information on some other keying event.

Each gateway will connect at least to the core network 16 (FIG. 1) and to its associated access network 12 and, therefore, will have at least two interfaces. However, a gateway may connect to more networks and, as a result, have an interface for each of the connections. Or, the particular gateway may have multiple connections to the core network, in addition to a connection or connections to an access network(s). Information concerning the resources of each interface would also be important, and therefore, a Gateway Interface Status Table is created and maintained, by each gateway element 14, identifying the resource of each interface, the amount used, and the amount available, in the same manner similar information is kept for the Trunks in the Gateway Trunk Status Tables for each gateway (FIGS. 10A and 10B). For example, suppose the gateway had five interfaces, G(1), G(2), . . . , G(5). FIG. 11 would be one form of Gateway Interface Status Table 140A listing information (allotted bandwidth bandwidth used and bandwidth available) for each interface.

The allotted bandwidth of each gateway 12 is used when a device on the access network associated with the gateway requests and is granted a QoS data transfer, thereby creating a data communication path for as long as the transfer takes. FIG. 12 illustrates the major steps of such a path creation procedure. The procedure, designated with the reference numeral 150, begins with step 152 when a request is received from a device or network entity (e.g., data processing system 36—FIG. 1) coupled to the associated access network (e.g., access network A). The request will be for a QoS path through the core network 16 with the characteristics of the path, such a bandwidth, class (e.g., class A, B, etc.), and such other QoS particulars as may be desired or needed.

The gateway, in step 154, will search its Gateway Interface Status Table 140A (FIG. 11) to see if it has the resources available at interfaces that connect to the core network 16 and the associated access network to grant the request. If not, the procedure 150 will branch from step 156 to step 184 where the gateway returns a "reject" to the requesting entity, rejecting the request, and then ending the procedure at step 190.

If, however, there is sufficient interface resource available, the procedure will move to step 160 to reserve the interface resource in anticipation of granting the request, and then search its Gateway Route Table 80 to find a route or routes to the connection corresponding to the address of the request. Once the route is found, the gateway will, at step 162, check to see if the route has the resource needed to match that of the request. If there are multiple routes available, such as would be the case if the data processing system 36 were requesting a QoS path for a data communication to data processing system 38 (i.e., routes R2 and R5—FIG. 4), the gateway would check the resources of all possible routes. If no route is found with the required resource needed, the procedure will moves to step 164 to decide if a trunk reconfiguration procedure (described more fully below with reference to FIG. 13) should be performed A trunk reconfiguration will attempt to temporarily re-allocate bandwidth to one or more of the Provisioned Links of the desired route. If a trunk reconfiguration is performed, and sufficient resource still not recovered, the request will be rejected (step 184) and the procedure terminated (step 190). If the trunk reconfiguration process does obtain sufficient resource, the procedure will proceed to step 170, described below.

The decision for a trunk reconfiguration request (step 164) may be preciously defined during initialization (e.g., set to only make a certain number of requests per unit of time), or based upon resource status.

If it is determined in step 164 that a trunk reconfiguration should not be performed, the procedure 150 will move to steps 184 and 190 to reject the request and terminate.

Assuming, in step 162, a route with sufficient resource is found, the sending gateway (i.e., the gateway that will grant the request) will reserve the resource and route, and step 162 will be exited in favor of step 170 where the sending gateway signals notifies the receiving gateway of the request. The receiving gateway, in step 172, will check its associated Gateway Interface Table 140 (FIG. 11) to determine if there is sufficient resource to handle the communication. If not, step 172 will move to step 174, which will be exited in favor of step 186 where the receiving gateway will return a "reject" to the sending gateway, which in turn will return a rejection of the request, in step 184, to the requesting entity, and terminate the procedure at step 190.

However, if the receiving gateway 12 finds that the interface does have the resources to handle the communication, in step 172, steps 172 and 174 are left in favor of step 176 where the receiving gateway sets up the necessary configuration to mark and forward the packets pursuant to the QoS path specified in the request. The receiving gateway 12 then will return an "approve" to the sending gateway. The sending gateway, in step 178, will also set up the necessary configuration for marking and forwarding packets according to the QoS requirements specified in the request by the requesting entity, and send an "approve" to the requesting entity. The procedure will then terminate with step 190. Thereafter, the requesting entity will begin the communication, send the packets necessary. When the requesting entity concludes its communication, it will send a "release" message to the associated gateway element 14. And in turn, the associated gateway element 14 will modify its Gateway Trunk Status Table 130 accordingly.

The major steps used for trunk reconfiguration process performed by the sending gateway in step 180 of the path creation procedure 150 is illustrated in FIG. 13. Briefly, the trunk reconfiguration process, designated with the reference numeral 200 in FIG. 13, operates to locate extra resources that can be at least temporarily re-allocated to a trunk of a sending gateway looking for a QoS path in response to a request. Not having found a route with sufficient resources in any of the trunks managed by the sending gateway, an effort to find a route by re-allocating the available resources of one or more trunks is made by trunk reconfiguration.

Thus, as FIG. 13 shows, the trunk reconfiguration process 200 begins with step 202, after the sending gateway has determined in step 180 of the path creation procedure 150 that a reconfiguration attempt is warranted. Step 202 sees the sending gateway sending a request to TMS 32 (FIG. 1) that includes an identification of the trunk needing more resource (e.g., bandwidth), and the amount of bandwidth needed. In step 204, the TMS 32 will search the TMS Trunk Status Table 110 (FIG. 9) for alternate trunks (managed by other gateways 12) that share the common Provisioned Link with the trunk identified in the request. For example, assume that the sending gateway 14 is gateway GA, and that after being unable to find a route with the resources necessary (i.e., bandwidth) for the QoS path requested by a sending entity of the access network associated with gateway GA (e.g., data processing system 36), the sending gateway initiates the trunk reconfiguration process 200. As FIG. 4, the gateway trunk table 80A, and the gateway trunk table 100A show, all outbound routes from the gateway GA use link a (which, when allocated resource, becomes trunk Aa). This trunk, however, is not a candidate for reconfiguration because it is fully managed by the gateway GA; that is, no other gateway manages it. FIG. 4 shows that there are two routes to the edge node (EC) from the gateway element EA, R5 and R2. Continuing with FIG. 4, note that link c, which provides the trunk (when provisioned) Ac (FIG. 8A) managed by the gateway GA, is shared by trunk Dc managed by gateway GD. Network link d also shared by trunks Ad and Dd of routes R2 and R4. Thus, either of the trunks Dc and Dd are candidates for the trunk reconfiguration process, and one would be made known to TMS 32 by the request sent thereto from gateway GA.

Accordingly, in step 204, using the Trunk Status Table 110, the TMS 32 will attempt to locate to find trunks that share the same link as the trunk identified in the reconfiguration request. If more than one trunk is found, the TMS 32 will select one based upon the available resource of that trunk. Then, the reconfiguration process 200 will, at step 206, check to see if the trunk found has sufficient resources available to permit temporary re-allocation of some resource. If the trunk has insufficient resource, the reconfiguration process 200 will move to step 208 to determine if the trunk found should be used anyway. If not, the TMS 216 will send a "reject" message back to the requesting/sending gateway As indicated above, the status information of the TMS Trunk Status Table 130 may lag the status information maintained by the gateways 14. The amount of lag depends upon how frequently the gateways send status update information to the TMS. Thus, the decision of step 208 is made in the hope that the status available to the TMS 32 is inaccurate, and that the particular trunk may indeed have the resource needed. Accordingly, the request of step 210 is made anyway.

If, on the other hand, step 206 determines that the selected trunk does have sufficient resources, or step 208 determines that the selected trunk should be used anyway, the TMS 32 will send a request to the gateway that manages the alternate trunk with an identification of the trunk and the amount of bandwidth needed or desired.

The gateway receiving the request for resources on the alternate trunk will check its associated Gateway Trunk Status Table 130 (FIG. 10), in step 212, to check the status of the requested alternate trunk. If the gateway determines that insufficient resources exist for that alternate trunk, the gateway will send a "reject" to the TMS 32, and the TMS 32, in step 214 decide whether to try again. If so, the process 200 will return to step 204.

The decision made in step 214 is based, at least in part, upon the fact that the trunk of a trunk may be shared by two or more gateways. Even if a trunk managed by one gateway does not have sufficient resource, another may. Hence, step 214 returns to step 204 to attempt to find another trunk with the resource needed. Alternatively, the criteria for the decision process used in step 214 by the TMS 32 can be based upon a preset number of attempts at locating an alternate trunk with sufficient resource, or some other factor(s).

If the gateway managing the alternate trunk determines, in step 212, that sufficient available resource does exist, step 212 will be left in favor of step 218, where the gateway managing the alternate trunk will send the TMS 32 an "approve," and adjust its associated Gateway Trunk Status Table 130 (reducing the amount of resource indicated in both the "Bandwidth" and the "Available" columns for the alternate trunk). The TMS 32 will also modify its TMS Trunk Status Table to reflect this re-allocation of resource.

In step 220, the TMS 32 will notify the gateway 14 that made the reconfiguration request that the request is granted, and also modify its TMS Trunk Status Table 110 to reflect the reconfiguration (i.e., re-allocation of resources) accordingly.

The gateway that sought the additional resource will also modify its Gateway Trunk Status Table 130 to reflect the added resource for the trunk in question, and end the process in step 224.

Prior network configurations and architectures for packet switching, using QoS path constructions, have typically managed the resources through the core network in terms of "paths" i.e., end-to-end connections. The present invention, on the other hand, as has been seen, manages the resources within a core network in units of "links." When a sending Gateway element 14 creates a path, it determines if the path can be created based upon the link resource (trunk resource) information that it manages, and does not need to ask any other entity for additional information. If the resource was managed in unit of "paths", the number of paths within a core network will grow in order of $n^2$ (depending upon the number of sending gateway elements multiplied by number of receiving gateway elements). If the resource is managed in unit of "links," as in the present invention, the number of paths will grow in order of n (depending upon the number of sending gateway elements). Comparing the number of paths/trunks that share a common Provisioned Link, the present invention will have 1/n that of the prior art. This will greatly increase the volume of resource that can be allocated to each trunk. This, in turn, means that "maximum capacity of QoS path" for each connection will be larger. The maximum capacity of a QoS path means the largest amount of capacity a QoS path can have in one time.

The resources of a link can be exchanged (via the trunk reconfiguration procedure) using the TMS 32 or the TMS function. This is accomplished without any interaction with the NMS 30 or configuration of the core network 16. A reserved resource for the trunks can be configured in more a flexible manner than is possible using the prior art methods. This flexibility will enable optimization of the trunk resource for various network conditions.

While a full and complete disclosure of the invention has been presented, it will be evident to those skilled in this art that modifications and alterations can be made. For example, while the NMS 30 and TMS 32 have been disclosed as separate elements, in fact the functions and operations they perform could be combined in one element. On the other hand, separate NMS and TMS elements is preferred since a function of the NMS 30, in the context of the present invention, is to reserve the total resource for a class (Provisioned Links) in the core network 16 and then provide that resource to the TMS 32. After this task, the NMS 30 will not need to interact with TMS 32, and the edge nodes 20 and relay nodes 24 of the core network 16 will have a static configuration. Since core network 16 does not have to be reconfigured in any way during path creation or trunk reconfiguration (although it could be), the processing load for network elements and the NMS 30 will be small. This will enable the system to scale as the network capacity and the transaction frequency grows.

In addition, it should also be evident that the gateway elements 14 and the corresponding edge nodes 20 can be integrated into a single node. In this case, the edge node will have the same function as the gateway element, such as signaling, resource management, and admission control that is mentioned above.

If the NMS and TMS are separate, the functions of the TMS can be distributed across several servers to manage a set of Provisioned Links. In this case, TMS will manage resources for set of Provisioned Links. Each gateway element will store information about which Provisioned Link is managed by which server, and will send a request for trunk reconfiguration to appropriate TMS, i.e., the TMS having responsibility for allocating the resource for the particular trunk for which reconfiguration is sought.

Also, the distribution of the functions of the TMS 32 across several servers can be made for management of gateways element groups. In this case, the TMS will manage resource for set of trunks that is managed by the corresponding group of gateway elements. Each gateway element will store information about which TMS it should contact to perform trunk reconfiguration, and sends request for trunk reconfiguration to appropriate TMS.

Alternatively TMS functions may be distributed across several servers according to which sets of Provisioned Links will be managed for a group of gateway elements. In this case, the TMS will manage trunk resources that reside in a set of Provisioned Links; that is, managed by a group of gateway elements. Each gateway element will, in accordance with this alternative, store information about which TMS it should contact to perform trunk reconfiguration for a certain trunk, and will send a request for trunk reconfiguration to appropriate TMS.

Also, although the gateway elements 14 have been described as including a control unit 60 coupled to a gateway device 62 by communicative coupling 64, they could be two separate elements that communicate with one another through in-line connections of the core network.

What is claimed is:

1. A data network for communicating data between a sender unit and a receiver unit, comprising:
   a core network including relay elements intercoupled by data links divided into a plurality of bandwidths;
   a gateway element coupled to the core network and to the sender unit, the receiver unit being coupled to the core network, the gateway element having at least one information table identifying at least one route from the gateway element through the core network to the receiver unit, including data links which constitute the at least one route, allocations of predetermined communication resources of the data links per each of the bandwidths, and status information indicative of an amount of currently used communication resources of the data links per each of the bandwidths and an amount of currently available communication resources of the data links per each of the bandwidths; and
   wherein a trunk management system allocates the bandwidth of the predetermined communication resources of the data links.

2. A method of management of data communication through a core network between a sender unit and a receiver unit that includes the steps of:
   defining at least one communicative route through the core network between the sender unit and the receiver unit that includes a plurality of network links that each have a predetermined communication resource;
   coupling the sender unit and the receiver unit to the core network with sending and receiving gateway elements, respectively;
   allocating to the sending gateway element a first portion of the predetermined communication resources of at least certain of the network links forming a communicative route between the sending and receiving gateway elements, and maintaining at the sending gateway element information indicative of the allocated predetermined communication resources and status information indicative of a currently used amount of the allocated communication resources and a currently available amount of the allocated communication resources;
   receiving at the sending gateway element a request from the sender unit for a data transfer across the communicative route, the request including a specification of requested communication resource, the sending gateway element checking the status information to grant the request if the currently available amount of the allocated communication resources of the communicative route is equal or greater than the requested communication resource.

3. The method of claim 2, including allocating a second portion of the predetermined communication resource to said certain of the network links.

4. The method of claim 3, wherein the step of checking the status information includes reconfiguring the predetermined communicative resource to said certain of the network links to re-allocate at least a portion of the communicative resource allocated to the receiving gateway element to the sending gateway element.

5. The method of claim 2, wherein the predetermined communication resource is a communication bandwidth.

6. The method of claim 2, wherein the predetermined communication resource includes a communication bandwidth.

7. A method of admission control of data to a core network having a number of relay nodes interconnected by data links, the method including the steps of:
   associating a predetermined data communication capacity with each of the data communicating links;
   communicatively coupling sending and receiving gateway elements to the core network;
   connecting first and second data transfer elements to the sending and receiving gateway elements, respectively, for data communication by a route through the core network containing certain of the data links;
   assigning first and second portions of the data communication capacity of at least the certain of the data links to the sending and receiving gateway elements, respectively; and
   providing the sending gateway element with information indicative of the first portion, the sending gateway element responding to a request for data communication of a requested capacity from the first data transfer element by checking the information, determining status information indicative of currently used data communication capacity of the certain links per each of the first portions and currently available data communication capacity of the certain links per each of the first portions, and granting the request if the currently available data communication capacity of the certain data links per each of the first portions is at least equal to or greater than the requested capacity,
   wherein the sending gateway element periodically sends the status information to a trunk management system,
   wherein the trunk management system allocates bandwidth to the certain links of the route based on the status information indicative of currently used data communication capacity of the certain links per each of the first portions and currently available data communication capacity of the certain links per each of the first portions.

8. The method of claim 7, wherein the providing step includes re-assigning at least a part of the second portion to the first portion of the data communication capacity of at least one of the certain data links.

9. The method of claim 8, including the step of providing the receiving gateway element with information indicative of the second portion.

10. The method of claim 9, wherein the step of re-assigning includes decreasing the information indicative of the second portion by the part of the second portion re-assigned to the first portion.

11. The method of claim 10, wherein the step of re-assigning includes increasing the information indicative of the first portion by the part of the second portion re-assigned to the first portion.

12. A system for providing a QoS communication route from a first communicating entity to a second communicating entity through a core network that includes a plurality of network links, the system including;
- a data store comprising an information table of information indicative of a predetermined communication resource associated with each network link;
- a sending gateway element and a receiving gateway element respectively coupling the first and second communicating entities to the core network;
- wherein the sending gateway element is configured to be assigned a first portion of the predetermined communication resources of at least certain of the network links forming a communicative route between the sending and receiving gateway elements, and to maintain at the sending gateway element information indicative of the assigned first portion and status information indicative of a currently used amount of the assigned first portion and a currently available amount of the assigned first portion; and
- wherein the sending gateway element is configured to receive a request from the sender unit for a data transfer across the communicative route, the request including a specification of requested communication resource;
- the sending gateway element checking the status information to grant the request if the currently available amount of the assigned first portions of the predetermined communications resources of the communicative route is equal or greater than the requested communication resource.

* * * * *